United States Patent Office 3,582,469
Patented June 1, 1971

---

3,582,469
PRODUCTION OF DOUBLE-STRANDED RIBONUCLEIC ACID
Jerome Birnbaum, Morganville, N.J., assignor to Merck & Co., Inc., Rahway, N.J.
No Drawing. Filed Sept. 27, 1968, Ser. No. 763,408
Int. Cl. C12d 13/06
U.S. Cl. 195—28                      6 Claims

ABSTRACT OF THE DISCLOSURE

Double-stranded ribonucleic acid is produced by *Escherichia coli* cells infected with the MU-9 mutant of MS2 coliphage and the specific productivity is increased by the timely addition of an antibiotic post-infection.

RELATED CASES

Ser No. 744,687 filed July 15, 1968 entitled "Production of Interferon Inducers" by Barbara D. Lago.

This invention relates to the production of interferon inducers and particularly to a process for improving the yield of double-stranded ribonucleic acid produced by *Escherichia coli* cells infected with the MU-9 mutant of MS2 coliphage.

The fact that double-stranded ribonucleic acid may come from this source is stated in an article entitled, "Inducers of Interferon and Host Resistance, IV. Double-stranded Replicative Form RNA (MS2-RF-RNA) from *E. coli* infected with MS2-coliphage," by A. K. Field, G. P. Lampson, A. A. Tytell and M. R. Hilleman, appearing in the Proceedings of the National Acadamy of Sciences (U.S.), vol. 58, No. 5 (November 1967), pp. 2102–2108. In that article it is reported the MS2 coliphage when grown in *E. coli* cells produces a double-stranded ribonucleic acid which proves to be an excellent inducer of interferon when administered to animals. This is also true of the MU-9 mutant which is obtainable from the New York University School of Medicine and this invention is concerned with this variant.

The above journal article describes the manner of *E. coli* culture, its infection with MS2 coliphage, and the recovery of the double-stranded ribonucleic acid (hereinafter called DS-RNA) in a purified form. Recent advances in this art made by Barbara D. Lago as disclosed and claimed in her patent application, Ser. No. 744,687, filed on July 15, 1968 have shown that the growth of the *E. coli* in a corn steep liquor medium and infection with the MU-9 mutant of MS2 coliphage, produces an increase of up to ten times and even more as much cell growth and a correspondingly greater amount of DS-RNA. It is an object of the present invention to additionally increase the production of DS-RNA from the *E. coli* culture which has been infected with the MU-9 mutant of MS2 coliphage.

In accordance with the present invention it has been found that the specific productivity of the DS-RNA relative to the amount of *E. coli* can be increased. This means that a greater amount of DS-RNA can be obtained from the same number of *E. coli* cells or alternatively that the same amount of DS-RNA is produced by fewer *E. coli* cells than were formerly required. This has the additional advantage of facilitating isolation of the DS-RNA because of its greater concentration in the growth medium.

In practicing this invention the *E. coli* can be grown in any one of the known culture media which will support its growth, and representative of these are media containing tryptone and/or corn steep liquor. To obtain more efficient use of the culture medium the *E. coli* should first be permitted to attain substantial growth, namely in excess of $5 \times 10^7$ cells per ml. of broth and preferably $5 \times 10^8$ cells per ml. but a greater number of cells can be utilized. At this time the MU-9 is added so that there are at least three to thirty but preferably six infective virus particles per single bacterium. Growth is continued so that the *E. coli* becomes fully infected.

The present invention increases the specific productivity (mg. DS-RNA/g. dry cells) by inhibiting the growth of *E. coli* (after infection with the virus) without affecting the level of DS-RNA produced. This is accomplished by adding growth-inhibitory antibiotics to the fermentation broth at a specified time after infection. The actual mechanism of increased specific productivity is to arrest *E. coli* cell growth in the tryptone medium without affecting synthesis of DS-RNA. Furthermore, in corn steep liquor medium there was a direct stimulation of DS-RNA synthesis coincident with a reduction in cell growth.

The antibiotics which are the most satisfactory to use in practicing the invention are the ones which inhibit protein synthesis such as, streptomycin, oxytetracycline and chloramphenicol but the invention is not limited to these specific antibiotics as the invention includes other bactericidal agents elaborated by the fermentative growth of microorganisms. They are added to the growth medium at 45 to 120 minutes post-infection and in the amount of 5 to 200 micrograms, preferably 50 to 100 micrograms, per ml. of the growth culture. The antibiotic may be added a few minutes earlier than 45 minutes or a few minutes later than 120 minutes but with diminished production of the DS-RNA relative to the *E. coli*, and generally the antibiotic should be added before 90 minutes post-infection time.

Although best results seem to occur if the culture medium is the corn steep liquor disclosed in said Lago application, the increased specific productivity of the invention is achieved also with commonly known culture mediums such as those containing tryptone. The increased specific productivity appears to be independent of the particular culture medium, but it would appear that with corn steep liquor it is obtained with or without growth inhibitor of the *E. coli* cells. With tryptone and like media the increased specific productivity is obtained only when the growth of *E. coli* is inhibited.

An additional benefit obtained from the antibiotic addition is that it decreases the likelihood of reversion of the mutant MU-9 back to MS2. During the prior practices of DS-RNA fermentation, some of the mutant virus MU-9 reverts back to the wild-type virus MS2. This reversion is undesirable since it may lead to lysis of the *E. coli* cells and cause loss of some of the DS-RNA into the medium. The use of an antibiotic in both tryptone and corn steep liquor media hinders the development of the undesirable MS2 phage. Thus, the use of the antibiotic has the additional advantage of decreasing the development of revertants.

The recovery process may be the same as that outlined in said Lago application or in the aforementioned journal article by Field et al. As is mentioned above, this recovery is facilitated because there will be a greater amount of the DS-RNA relative to the *E. coli* cells and the growth medium.

Representative examples are the following:

Example I

*E. coli* was grown and maintained on tryptone agar of the following composition in grams per liter of water: tryptone, 10; yeast extract 1.0; dextrose, 1.0; sodium chloride, 8.0; calcium chloride, 0.22; and agar, 15. Inoculum cells were prepared by growth for 16 hours at 37° C. in the same medium lacking agar. These cells were used to inoculate several identical batches of the tryptone culture medium and incubated at 37° C. on a gyrotary shaking device to aerate the growing cells. When the population reached 5x10³ cells per ml. of broth, MU-9 virus was added so that there were 6 infective virus particles per single bacterium. Incubation was then continued at 37° C.

At various times post infection chloramphenicol was added (except to the control batch) and after 300 minutes post-infection each batch was assayed for DS-RNA relative to the dry weight of the E. coli cells. The results are shown in Table 1.

TABLE 1

Effect of chloramphenicol on the growth and double-stranded RNA synthesis of E. coli infected with MU-9 bacteriophage

| Time of addition of chloramphenicol post-infection, min. | Chloramphenicol added at 50 µg./ml. | | | | | |
|---|---|---|---|---|---|---|
| | Growth (dry weight) | | Double-stranded RNA | | | |
| | Mg./ml. | Percent of control | Mg./l. | Percent of control | Mg./g. | Percent of control |
| Not added (control) | 0.52 | 100 | 49.5 | 100 | 95.2 | 100 |
| 0 | 0.14 | 27 | 3.80 | 8 | 27.2 | 29 |
| 15 | 0.18 | 35 | 4.45 | 9 | 24.8 | 26 |
| 30 | 0.21 | 40 | 4.42 | 9 | 21.1 | 22 |
| 45 | 0.27 | 52 | 37.9 | 77 | 140 | 147 |
| 60 | 0.34 | 65 | 50.0 | 101 | 147 | 154 |
| 90 | 0.41 | 79 | 49.5 | 100 | 120 | 126 |
| 120 | 0.45 | 87 | 47.5 | 96 | 106 | 111 |
| | Chloramphenicol added at 100 µg./ml. | | | | | |
| Not added (control) | 0.64 | 100 | 28.2 | 100 | 44.1 | 100 |
| 0 | 0.26 | 41 | 2.07 | 7 | 7.95 | 18 |
| 15 | 0.28 | 44 | 2.86 | 10 | 10.0 | 23 |
| 30 | 0.37 | 58 | 13.0 | 46 | 35.3 | 80 |
| 45 | 0.42 | 66 | 25.2 | 90 | 60.0 | 136 |
| 60 | 0.45 | 70 | 25.9 | 92 | 57.6 | 131 |
| 90 | 0.50 | 78 | 29.0 | 103 | 58.1 | 132 |

This Table 1 shows that when the antibiotic was added at 0 to 30 minutes after infection, there was a significant inhibition of growth; however, there occurred also a severe inhibition of DS-RNA synthesis. If the antibiotic was still inhibited but DS-RNA synthesis (mg./l.) was unaffected. However, the specific productivity (mg./g. dry cells) increased 45 to 54% in one experiment and 31 to 36% in the other. In tryptone broth the total DS-RNA synthesized (mg./l.) in flasks receiving the antibiotic were equivalent within experimental error, to that synthesized by untreated control cells. This illustrates that the antibiotic was increasing specific productivity in the tryptone broth by inhibiting growth without affecting DS-RNA synthesis.

Example II

The procedure of Example I was carried out, using oxytetracycline; similar results are obtained as is shown by Table 2.

TABLE 2

Effect of oxytetracycline on growth and double-stranded RNA synthesis by E. coli infected with MU-9 bacteriophage

| Time of addition of oxytetracycline post-infection, min. | Oxytetracycline added at 50 µg/ml. | | | | | |
|---|---|---|---|---|---|---|
| | Growth (dry weight) | | Double-stranded RNA | | | |
| | Mg./ml. | Percent of control | Mg./l. | Percent of control | Mg./g., cells | Percent of control |
| Not added (control) | 0.54 | 100 | 39.7 | 100 | 73.5 | 100 |
| 0 | 0.20 | 37 | 0.7 | 2 | 4.0 | 5 |
| 15 | 0.28 | 52 | 4.2 | 11 | 15.0 | 20 |
| 30 | 0.36 | 67 | 25.1 | 6 | 69.8 | 95 |
| 45 | 0.42 | 78 | 39.7 | 100 | 90.0 | 122 |
| 60 | 0.45 | 83 | 49.0 | 123 | 109 | 148 |
| 90 | 0.44 | 81 | 40.0 | 100 | 90.9 | 125 |
| 120 | 0.43 | 80 | 35.5 | 89 | 85.0 | 113 |

Example III

The procedure of Example I was carried out, using streptomycin. Similar results are obtained as is shown by Table 3.

TABLE 3

Effect of streptomycin on growth and double-stranded RNA synthesis by E. coli infected with MU-9 bacteriophage

| Time of addition of streptomycin post-infection, min. | Streptomycin added at 50 µg./ml. | | | | | |
|---|---|---|---|---|---|---|
| | Growth (dry weight) | | Double-stranded RNA | | | |
| | Mg./ml. | Percent of control | Mg./l. | Percent of control | Mg./g., cells | Percent of control |
| Not added (control) | 0.67 | 100 | 41.4 | 100 | 61.8 | 100 |
| 0 | 0.23 | 34 | 2.52 | 6 | 9.0 | 15 |
| 15 | 0.34 | 51 | 3.10 | 8 | 9.1 | 15 |
| 30 | 0.35 | 52 | 6.52 | 16 | 18.7 | 30 |
| 45 | 0.46 | 69 | 27.6 | 67 | 60.0 | 97 |
| 60 | 0.52 | 78 | 46.2 | 112 | 89.0 | 145 |
| 90 | 0.56 | 84 | 42.7 | 103 | 76.4 | 122 |
| 120 | 0.56 | 84 | 42.7 | 103 | 76.4 | 122 |

Example IV

E. coli was added to each of several identical batches of corn steep liquor prepared as follows:

Rawcorn steep liquor was diluted with an equal volume of water and solid sodium hydroxide is added until pH 7 was attained. This solution was heated for 1 hour at 100° C., cooled, centrifuged to remove insoluble material, diluted 10 fold with water, heated to boiling, cooled and recentrifuged to remove any further insoluble material. The final supernatant fluid is used as growth medium for *E. coli*. *E. coli* cells are inoculated into this medium and allowed to incubate at 37° C. under shaking conditions.

At the time that 1.28 mg. (dry weight) of cells per ml. of culture was attained MU-9 bacteriophage was added to give 6 infective virus particles per bacterium, and incubation was continued. At various times, post-infection streptomycin was added (except to the control batch) and after 300 minutes post-infection each batch was assayed for DS-RNA relative to the dry weight of the *E. coli* cells. The results are shown in Table 4.

TABLE 4
The effect of streptomycin on the growth and the synthesis of double-stranded RNA by *E. coli* infected with MU-9 bacteriophage

| | Streptomycin added at 100 μg/ml. | | | | | |
|---|---|---|---|---|---|---|
| Time of addition of streptomycin post-infection, min. | Growth (dry weight) | | Double-stranded RNA | | | |
| | Mg./ml. | Percent of control | Mg./l. | Percent of control | Mg./g., cells | Percent of control |
| Not added (control) | 2.66 | 100 | 127 | 100 | 47.8 | 100 |
| 0 | 1.22 | 46 | 0 | 0 | 0 | 0 |
| 15 | 2.21 | 83 | 0 | 0 | 0 | 0 |
| 30 | 2.60 | 98 | 0 | 0 | 0 | 0 |
| 45 | 1.79 | 67 | 7.8 | 6 | 4.4 | 10 |
| 60 | 2.24 | 84 | 14.9 | 12 | 6.7 | 14 |
| 90 | 2.56 | 96 | 187 | 147 | 73.5 | 153 |
| 120 | 2.72 | 102 | 193 | 152 | 70.9 | 148 |

As in tryptone medium the addition of the antibiotic early in the infection inhibited growth and DS-RNA synthesis. When added at 90 to 120 minutes, there was a 48 to 53% increase in specific productivity (mg./g.). In Table 4, however, the increase was due to a direct effect of streptomycin on DS-RNA synthesis and not on growth since the dry weight of the cells at harvest was equal to that of the control values.

Example V

To determine the relative effect of various amounts of streptomycin the procedure of Example IV was carried out by adding the streptomycin to identical batches all at 90 minutes post-infection. The results of the varying amounts of streptomycin on DS-RNA production are shown in Table 5.

TABLE 5
Effect of streptomycin on growth and double-stranded RNA synthesis by *E. coli* infected with MU-9 bacteriophage

| | Growth (dry weight) | | Double-stranded RNA | | | |
|---|---|---|---|---|---|---|
| Streptomycin at 90 min. post-infection, μg./ml. | Mg./ml. | Percent of control | Mg./l. | Percent of control | Mg./g., cells | Percent of control |
| 0 | 4.16 | 100 | 108 | 100 | 25.9 | 100 |
| 10 | 3.24 | 78 | 129 | 119 | 40.0 | 154 |
| 50 | 2.75 | 66 | 146 | 135 | 53.3 | 210 |
| 100 | 2.72 | 65 | 150 | 139 | 55.2 | 213 |

Table 5 shows that there was an inhibition of growth coincident with a direct stimulation of DS-RNA synthesis (mg./l). The result was a phenomenal 110 and 113% increase in specific productivity for infected cultures receiving 50 and 100 μg./ml. of streptomycin, respectively. Thus, in the corn steep medium the antibiotic increases productivity by either limiting growth after infection or by stimulating directly the synthesis of DS-RNA.

Example VI

The procedure of Example IV was carried out to determine whether an earlier harvest time was possible. It was duplicated and harvested at 180 minutes and 300 minutes post-infection, respectively, and the results are shown in Table 6.

TABLE 6
The effect of streptomycin and time of harvest on double-stranded RNA synthesis by *E. coli* infected with MU-9 bacteriophage

| Time of harvest post-infection, min. | Streptomycin at 90 min. post-infection, μg./ml. | Double-stranded RNA | | | |
|---|---|---|---|---|---|
| | | Mg./l. | Percent of control | Mg./g. cells | Percent of control |
| 180 | 100 | 242 | 109 | 96.9 | 136 |
| 180 | 0 (control) | 223 | 100 | 71.0 | 100 |
| 300 | 100 | 208 | 118 | 93.0 | 141 |
| 300 | 0 (control) | 177 | 100 | 65.9 | 100 |

Table 6 shows that there is no need to wait 300 minutes before harvesting; 180 minutes after infection appears to give somewhat better results. In this experiment, there was only a slight (9-18%) direct stimulation on DS-RNA synthesis and a 36 to 41% increase in specific productivity. A harvest time of 180 minutes seemed better than 300 minutes because the total DS-RNA synthesized (mg./l.) was higher at the earlier period.

Examples VII and VIII

The fact that other antibiotics can be used to obtain increased DS-RNA production is shown in the following Tables 7 and 8.

TABLE 7
[Effect of penicillin on growth and double-stranded RNA synthesis by *E. coli* infected with MU-9 bacteriophage in tryptone broth]

| | Penicillin added at 100 μ/gml. | | | | | |
|---|---|---|---|---|---|---|
| Time of addition of penicillin G post-infection, minutes | Growth (dry weight) | | Double-stranded RNA | | | |
| | Mg./ml. | Percent of control | Mg./l. | Percent of control | mg./g, cells | Percent of control |
| Not added (control) | 0.58 | 100 | 36.2 | 100 | 62.4 | 100 |
| 0 | 0.37 | 64 | 18.8 | 52 | 50.8 | 81 |
| 15 | 0.42 | 72 | 18.8 | 52 | 44.8 | 72 |
| 30 | 0.45 | 78 | 18.3 | 51 | 40.7 | 65 |
| 45 | 0.50 | 86 | 33.7 | 93 | 67.4 | 108 |
| 60 | 0.51 | 88 | 32.8 | 91 | 64.3 | 103 |
| 90 | 0.53 | 91 | 33.5 | 93 | 63.2 | 101 |
| 120 | 0.56 | 97 | 33.5 | 93 | 59.8 | 96 |

TABLE 8

[Effect of polymyxin on the growth and double-stranded RNA synthesis of *E. coli* infected with MU-9 bacteriophage in tryptone broth]

| Time of addition of penicillin G post-infection, minutes | Polymixin added at 100 µg/ml. | | | | | |
|---|---|---|---|---|---|---|
| | Growth (dry weight) | | Double-stranded RNA | | | |
| | Mg./ml. | Percent of control | Mg./l. | Percent of control | mg./g., cells | Percent of control |
| Not added (control) | 0.67 | 100 | 53.4 | 100 | 79.6 | 100 |
| 0 | 0.10 | 15 | 0 | 0 | 0 | 0 |
| 15 | 0.12 | 18 | 0.83 | 2 | 6.92 | 9 |
| 30 | 0.18 | 37 | 1.7 | 3 | 9.45 | 12 |
| 60 | 0.38 | 57 | 18.0 | 34 | 47.3 | 59 |
| 90 | 0.52 | 78 | 40.0 | 74 | 77.0 | 97 |
| 120 | 0.53 | 79 | 43.7 | 82 | 82.5 | 104 |

What is claimed is:

1. The process for obtaining double-stranded ribonucleic acid which comprises adding *Escherichia coli* to a nutrient culture medium and permitting growth to occur, then adding MU–9 mutant of MS2 coliphage to infect the growing *E. coli*, then adding an antibiotic at about 45 to about 120 minutes post-infection to inhibit the growth of the *E coli* and thereby obtain an increased productivity of DS-RNA relative to the *E.* coli cells.

2. The process according to claim 1 in which the culture medium includes tryptone.

3. The process according to claim 1 in which the culture medium is corn steep liquor.

4. The process according to claim 1 in which the MU–9 mutant is added when the *E. coli* count is at least $5 \times 10^7$ cells per ml. of broth.

5. The process according to claim 1 in which the antibiotic is added before about 90 minutes post-infection.

6. The process according to claim 1 in which the antibiotic is added at 45 to 120 minutes post-infection in the amount of 5 to 200 micrograms per ml. of broth.

References Cited

Davidson et al.: Progress In Nucleic Acid Research and Molecular Biology, vol. 6, p. 377–381 (1967).

Field et al.: National Academy of Sciences, vol. 58, No. 5, November 1967, p. 2102–2108.

ALVIN E. TANENHOLTZ, Primary Examiner

U.S. Cl. X.R.

195—2, 1.5